United States Patent [19]

Mukai et al.

[11] Patent Number: 5,619,654
[45] Date of Patent: Apr. 8, 1997

[54] SYSTEM FOR IMPLEMENTING USER REQUEST BY DIVIDING THE RETRIEVED CORRESPONDING PROCEDURE INTO FIRST COMMAND TO OBTAIN APPARATUS NAME AND SECOND COMMAND TO OBTAIN OPERATION CONTENT

[75] Inventors: Masaki Mukai, Izumisano; Takashi Ohtsu, Yawata; Kouichi Yasutake, Kyoto, all of Japan

[73] Assignee: Matsushita Electric Industrial Co., Ltd., Osaka, Japan

[21] Appl. No.: 270,020

[22] Filed: Jul. 1, 1994

[30] Foreign Application Priority Data

Jul. 5, 1993 [JP] Japan ................... 5-165550

[51] Int. Cl.⁶ .................................................. G06F 13/00
[52] U.S. Cl. ................... 395/200.09; 340/825.22
[58] Field of Search ............... 395/200.09; 340/825.21, 340/825.22, 825.52, 825.54

[56] References Cited

U.S. PATENT DOCUMENTS

| | | | |
|---|---|---|---|
| 4,174,517 | 11/1979 | Mandel | 340/310 |
| 4,808,841 | 2/1989 | Ito et al. | 307/11 |
| 4,851,988 | 7/1989 | Trottier et al. | 395/200.01 |
| 4,989,081 | 1/1991 | Mizygawa et al. | 348/61 |
| 5,086,385 | 2/1992 | Launey et al. | 364/188 |
| 5,113,294 | 5/1992 | Kim | 360/33.1 |
| 5,235,414 | 8/1993 | Cohen | 358/84 |
| 5,237,305 | 8/1993 | Ishikuro et al. | 340/286.01 |
| 5,287,500 | 2/1994 | Stoppani, Jr. | 395/650 |
| 5,382,951 | 1/1995 | White et al. | 340/825.52 |
| 5,457,446 | 10/1995 | Yamamoto | 340/825.25 |

FOREIGN PATENT DOCUMENTS 55-118525 2/1980 Japan.
3-10596 1/1991 Japan.

OTHER PUBLICATIONS

"A Yellow–Pages Service for a Local–Area Network", by Larry L. Peterson, 1988, pp. 235–242.

Primary Examiner—Thomas C. Lee
Assistant Examiner—Moustafa Mohamed Meky
Attorney, Agent, or Firm—Price, Gess & Ubell

[57] ABSTRACT

An apparatus control system where a major terminal for inputting a user's request is connected via a communication path to at least one apparatus terminal which has an apparatus for implementing the user's request. Such apparatus control system comprises a request accepting unit for accepting the user's request written in a certain form, a storing unit for storing a correspondence table which corresponds a control procedure written in a certain rule to each request, a retrieving unit for retrieving the control procedure, a corresponding apparatus identifying unit for interpreting the retrieved control procedure to identify the apparatus, an implementation directing unit for transmitting to the identified apparatus a command which directs an implementation of the user's request, and an implementation controller for receiving the command and controlling an operation of the apparatus according to the received command.

17 Claims, 17 Drawing Sheets

Fig. 4

| object | operation | control procedure |
|---|---|---|
| movie[,title] | watch | execute(retVal.equipment,"show",retVal.arg1);<br>where retVal=whichHas("movie",title); |
| movie[,title] | record | {connect(retVal1.equipment,retVal2.equipment);<br>execute(retVal2.equipment,"recordVideo");<br>execute(retVal1.equipment,"show",retVal1.arg1);}<br>where retVal1=whichHas("movie",title);<br>& retVal2=whichCan("recordVideo"); |
| music[,title] | listen to | execute(retVal.equipment,"show",retVal.arg1);<br>where retVal =whichHas("music",title); |
| music[,title] | watch | {connect(retVal1.equipment,retVal2.equipment);<br>execute(retVal2.equipment,"recordAudio");<br>execute(retVal1.equipment,"show",retVal1.arg1);}<br>where retVal1=whichHas("music",title);<br>& retVal2=whichCan("recordAudio"); |
| weather forecast | know | execute(retVal.equipment,"show",retVal.arg1);<br>where retVal.=whichHas("weather forecast"); |
| (don't care) | loud | execute(retVal.equipment,"volumeUp");<br>where running=whichIs("On");<br>& retVal=witchCan("volumeUp");<br>& retVal.equipment==running |
| (don't care) | soft | execute(retVal.equipment,"volumeDown");<br>where running=whichIs("On");<br>& retVal=witchCan("volumeDown");<br>& retVal.equipment==running |

Fig. 6A

| genre | program(time,channel,title) |
|---|---|
| movie | (21:00-23:21,4,"Gone with the Wind") (21:00-22:54,10,"E.T.") . . . |
| music | (20:00-20:54,6,"Music Station") (21:00-22:30,2,"Beatles Live") (23:30-24:00,8,"MTV") . . . |
| sports | (13:00-15:30,10,"W-Cup Soccer") (19:00-20:54,8,"Baseball :Giants vs.Tigers") . . . |
| drama | (14:00-15:00,2,"Twin Peaks") (21:00-21:30,6,"Oshin") . . . |
| weather forecast | (20:54-21:00,6,"Weather forecast") (22:54-23:00,10,"Weather Forecast") . . . |
| news | . . . |
| . . . | . . . |

Fig. 7A program information table

| genre | program (time, MHz, title) |
|---|---|
| music | (19:00-20:00),80.2, "Saturday Music") (21:00-23:00, 85.1, "Weekly Top 10") . . |
| weather forcast | (19:55-20:00,88.1, "weather forcast") (21:55-23:00, 85.1, "weather information") . . |
| traffic information | (19:55-20:00,85.1, "traffic news") (20:55-21:00, 80.2, "traffic information") |
| news | . . |
| . . | . . |

Fig. 7A program information table

| genre | program (time, MHz, title) |
|---|---|
| music | (19:00-20:00), 80.2, "Saturday Music") (21:00-23:00, 85.1, "Weekly Top 10") . . . |
| weather forcast | (19:55-20:00, 88.1, "weather forcast") (21:55-23:00, 85.1, "weather information") . . . |
| traffic information | (19:55-20:00, 85.1, "traffic news") (20:55-21:00, 80.2, "traffic information") |
| news | . . . |
| . . . | . . . |

Fig. 7B command table

| command | control |
|---|---|
| show n | turn ON, tuning (frequency n) |
| band n | band switch (band n) |
| volumeUp | Volume UP |
| volumeDown | Volume DOWN |

Fig. 8A

[VTR]

program information table

| genre | program(number) |
|---|---|
| movie | 1  2  5 |
| music | 3 |
| sports | |
| documentary | 4 |
| . . . | |

Fig. 8B command table

| command | control |
|---|---|
| show n | switch ON, replay nth program |
| recordVideo | switch ON, record |
| replay | switch ON, replay |

Fig. 12

| object | operation | output media type |
|---|---|---|
| movie[,title] | watch | voice * image |
| movie[,title] | record | voice image recordable media |
| music[,title] | listen to | voice |
| music[,title] | record | voice recordable media |
| weather forecast | know | voice + image + text |

Fig. 13

| apparatus | command | input media type | output media type |
|---|---|---|---|
| CD player | replay | CD | voice signal |
| tape deck | record | voice signal | audio tape |
| tape deck | replay n | audio tape | voice signal |
| VTR | replay n | video tape | image signal, voice signal |
| VTR | record | image signal, voice signal | video tape |
| video tuner | TV n | radio wave | image signal, voice signal |
| TV | TV n | radio wave | image, voice |
| TV | external input | image signal, voice signal | image, voice |

SYSTEM FOR IMPLEMENTING USER REQUEST BY DIVIDING THE RETRIEVED CORRESPONDING PROCEDURE INTO FIRST COMMAND TO OBTAIN APPARATUS NAME AND SECOND COMMAND TO OBTAIN OPERATION CONTENT

BACKGROUND OF THE INVENTION

1 Field of the Invention

The present invention relates to an apparatus control device for providing a centralized control over a plurality of apparatuses, such as a plurality of AV apparatuses installed in a home.

2 Description of Related Art

There have been existing various sorts of control systems which control apparatuses, home electric apparatuses in particular connected to a control bus by sending them a control signal (hereunder called as a home-bus-system). In the home-bus-system, a control signal is generated according to a control procedure which is preset beforehand or directly inputted by an input unit, from data (address) which identifies the apparatus to be controlled, and data (command) which indicates how the identified apparatus should be controlled. Then, the generated control signal is sent on the control bus.

In a commonly used home-bus-system, the button which designates a control operation is provided on the operation panel, such as "TV ON" or "replay CD (compact disc) player". When the user presses such button, the corresponding control signal is sent on the control bus. Therefore, when the user wants to listen to a certain song on the CD player, he/she presses the button for "CD player ON" on the operation panel, then presses the button for "replay CD player", or the like.

The conventional home-bus-system has a drawback in that the user cannot watch a movie or listen to a song unless he/she identifies the apparatus, and is aware of its operation. Therefore, the home-bus-system has been inconvenient for a user who wants to watch a movie, listen to a song, and so on, but is not skilled in technological arts. Moreover, recently home electric apparatuses have become more and more sophisticated, and become affluent in kind. Therefore, it is very difficult for untrained users in home environments to operate them correctly, and they have been increasingly desirous of obtaining an electric control system for enabling an easy to use control over such electric apparatuses.

SUMMARY OF THE INVENTION

Accordingly, it is an object of the present invention to provide an apparatus control system for enabling an user to implement a desired operation with an apparatus without knowing how to operate the apparatus.

The above object may be fulfilled by an apparatus control system where a major terminal for inputting a user's request is connected via a communication path to an apparatus terminal which has an apparatus for implementing the user's request, the apparatus control system comprising a request accepting unit for accepting the user's request written in accordance with a certain form, a storing unit for storing a correspondence table where each request is corresponded to a control procedure written in accordance with a certain rule, a retrieving unit for retrieving the control procedure which corresponds to each user's request, a corresponding apparatus identifying unit for interpreting the retrieved control procedure to identify the apparatus which implements the user's request, an implementation directing unit for transmitting to the identified apparatus a command which directs an implementation of the user's request, and an implementation controller for receiving the command and controlling an operation of the apparatus according to the received command.

The request accepting unit may comprise a receiving unit for receiving an object specifier included in each user's request, and another receiving unit for receiving an operation content included in the user's request.

The storing unit may correspond the control procedure to a pair of the object specifier and the operation content.

The control procedure may comprise an inquiry which asks if there exists any apparatus which possesses the object specifier and the operation content included in the user's request and if such apparatus has been turned on, and an implementation statement which specifies the apparatus based upon a response to the inquiry and directs the specified apparatus to implement the user's request; the corresponding apparatus identifying unit may comprises a unit for interpreting and executing the inquiry; and the implementation directing unit may comprise a unit for interpreting and executing the implementation statement.

The apparatus terminal may further comprise a responding unit for accepting the inquiry from the major terminal, and transmitting a response if its own apparatus possesses information relating to the accepted inquiry.

The apparatus at the apparatus terminal may be a visual and audio apparatus such as a TV, a VTR, or a CD player; each apparatus terminal may have a program information table where programs possessed by its apparatus are classified by genre; and the responding unit at each apparatus terminal may search the genre which includes a certain program when the inquiry from the major terminal asks if the apparatus terminal possesses the certain program.

The apparatus at the apparatus terminal may be a visual and audio apparatus such as a TV, a VTR, or a CD player, and the major terminal may further comprise a program information table where programs possessed by the apparatus at each apparatus terminal are classified by genre, and a responding unit for searching the genre including a certain program when the inquiry from the corresponding apparatus identifying unit asks if the major terminal possesses the certain program, and making a response to the inquiry if the major terminal possesses it.

The above object may be fulfilled by an apparatus control system where a major terminal for inputting a user's request is connected via a communication path to an apparatus terminal which has an apparatus for implementing the user's request, the apparatus control system comprising a request accepting unit for dividing each user's request into an object specifier and an operation content indicating what to be done with the object of the object specifier, and accepting the object specifier and the operation content separately, a corresponding apparatus identifying unit for identifying the apparatus which is specified exclusively by the object specifier and the operation content, and detecting an operation of the identified apparatus which is required to implement the user's request, a control procedure generating unit for generating a control procedure in accordance with a certain rule from the identified apparatus and the detected operation, an implementation directing unit for interpreting the generated control procedure and transmitting a command to the identified apparatus to implement the user's request, and an implementation controller for receiving the command, and controlling the apparatus according to the command.

The apparatus identifying unit may comprise a first table for storing a correspondence between an output form and a pair of the object specifier and the operation content included in the user's request, the output form being a media which will be received by the user when his/her request is implemented, a second table for storing an input form and an output form according to each operation of each apparatus, an output form detecting unit for searching the first table by the user's request to detect the output form which will be employed to implement the user's request, a judging unit for searching the second table by the apparatus possessing the object, detecting the output form of the apparatus, and judging if the detected output form coincides with the output form detected from the first table, a subordinate apparatus detecting unit for, when the judging unit judges that the output form from the second table does not coincide with the output form from the first table, detecting the apparatus which possesses the output form from the second table as its input form, sending the output form of the detected apparatus to the judging unit so that the output form is compared with the output form from the first table, and repeating its operations until the judging unit finds the coincidence between the output form from the first table and the output form from the second table, in which when the judging unit finds the coincidence, the control procedure generating unit generates a control procedure by which the detected apparatus implements the operation included in the user's request if only one apparatus is detected, while if a plurality of apparatuses are detected, the control procedure generating unit generates a control procedure by which the detected apparatuses are connected in order of the detection.

The corresponding apparatus identifying unit may further comprise an inquiry unit for inquiring of each apparatus terminal if it possesses the object specifier included in the user's request before the judging unit starts its operation, and a response receiving unit for receiving a response from the apparatus which was found to possess the object by the inquiry.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows a table stored in a storage in the apparatus control device;

FIGS. 6A, 7A, and 8A show examples of program information tables stored in storage of the terminal apparatuses respectively;

FIGS. 6B, 7B, 8B show examples of command tables stored in storage of the terminal apparatuses respectively;

FIGS. 12, and 14A–14B show a further embodiment of the present invention in which FIGS. 12 and 13 show tables stored in storage of a apparatus control device, and FIGS. 14A and 14B show flow charts describing a control by the apparatus control device.

DESCRIPTION OF PREFERRED EMBODIMENTS

[Embodiment 1]

Figure 1:
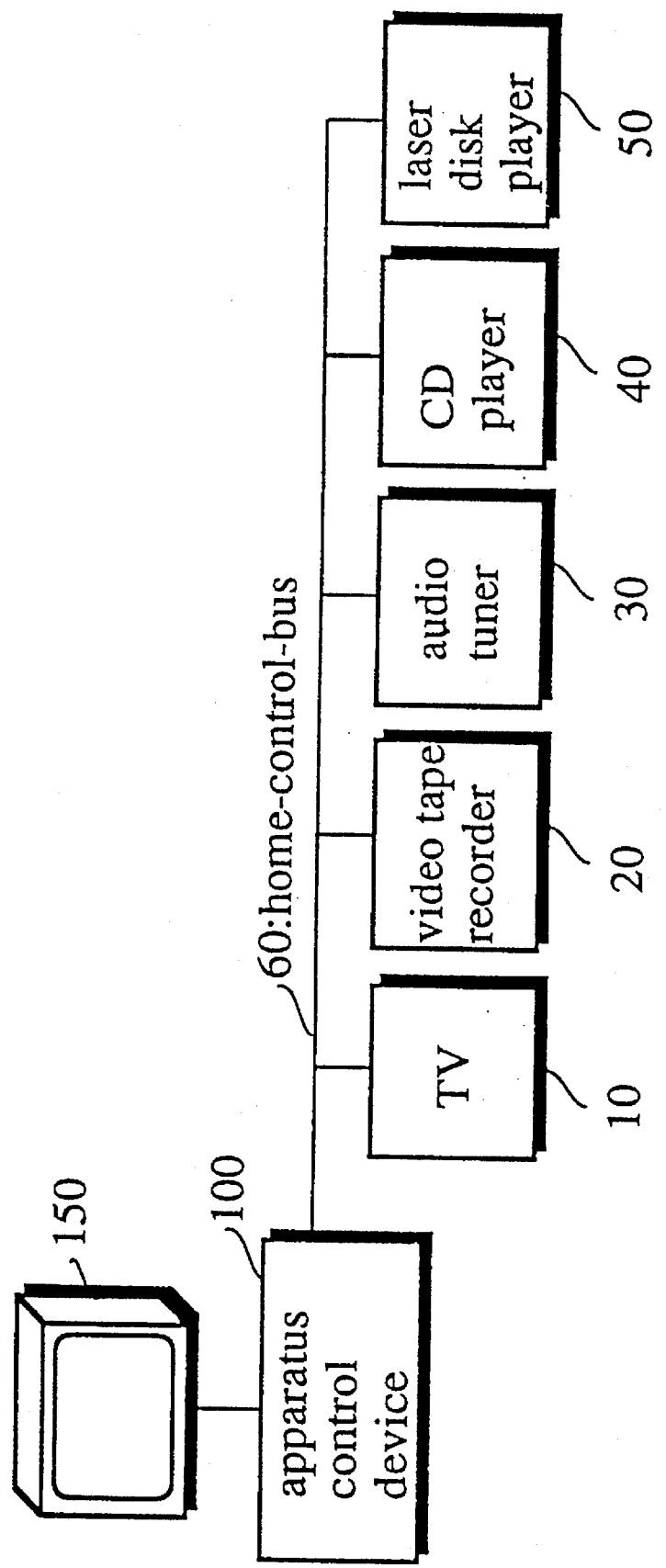
FIG. 1 shows the entire configuration of an apparatus control system in a first embodiment of the present invention.

FIG. 1 is a block diagram showing the configuration of an apparatus control system in a first embodiment of the present invention. The apparatus control system in FIG. 1 comprises home electric apparatus such as a TV 10, a video tape recorder 20, an audio tuner 30, a CD player 40, a laser disk player 50 (hereunder referred to as terminal apparatuses 10–50); an apparatus control device 100 for controlling these terminal apparatus via a home-control-bus 60 (hereunder referred to as a control bus). The apparatus control device 100 transmits a control signal to the desired apparatus via the control bus, and hence a home electric apparatus and the like are controlled centrally.

Figure 2:
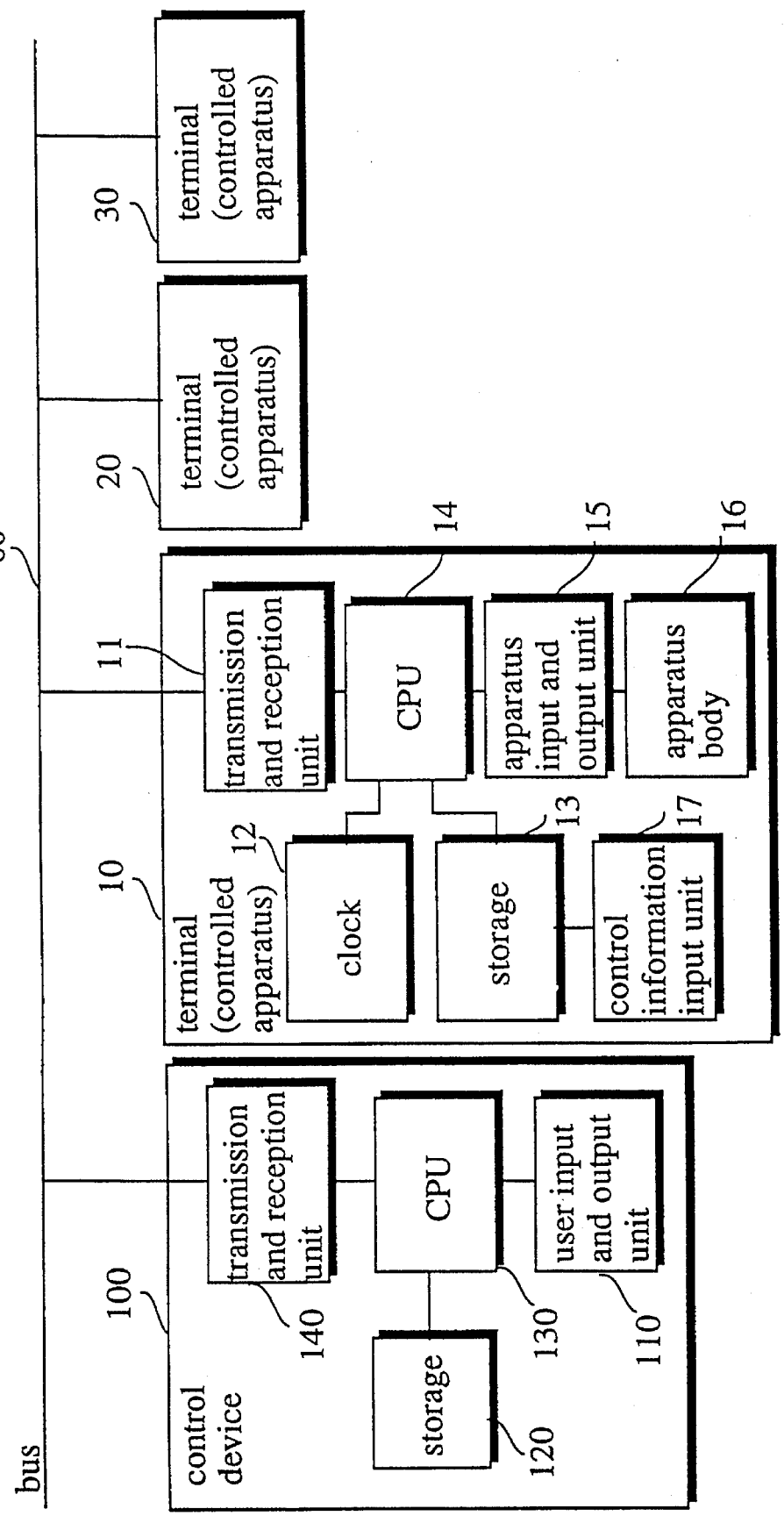
FIG. 2 is a block diagram showing an apparatus control device and terminal apparatuses in the apparatus control system of FIG. 1;.

FIG. 2 is a block diagram showing the apparatus control device 100 and terminal apparatuses 10–50. The apparatus control device 100 comprises a user input and output unit 110, a storage 120, a CPU 130, and a transmission and reception unit 140.

Figure 3:
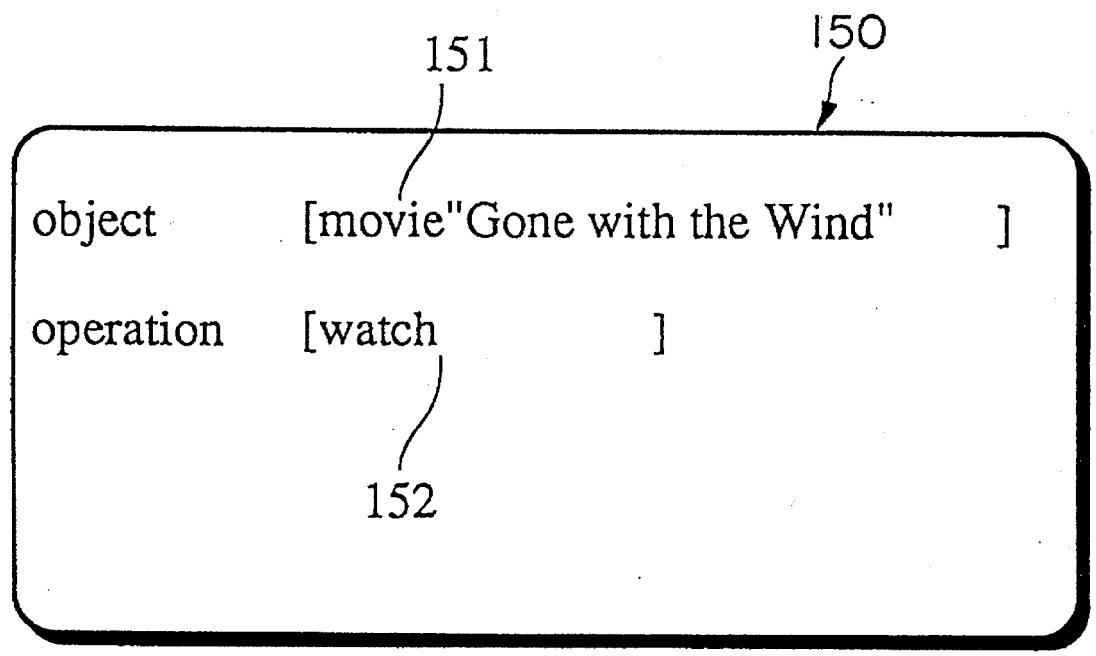
FIG. 3 shows a screen in the apparatus control device to which a user's request is inputted.

The user input and output unit 110 comprises a keyboard and a CRT 150 shown in FIG. 3 to input a user's request and command, and displays a response from the terminal apparatuses to the user's request. For example, when the user requests to "watch the movie of 'Gone with the Wind'", he/she inputs "movie: Gone with the Wind" under an object 151, and inputs "watch" under an operation 152. Although not illustrated in FIG. 3, the messages of "your requested TV program/movie/song is not found", "you requested program will be broadcasted pm. 8:00–9:00 today", and "recording of your requested program is set" are displayed on a display screen.

As shown in FIG. 4, the storage 120 has a table comprising an object field 121, an operation field 122, and a control procedure field 123. The object field 121 discloses object specifiers which may be requested by users and can be provided by either of the terminal apparatuses, such as movie, music, and weather forecast. In the object field 121, "title" in [, title] represents title of a movie, song, or the like; while [] indicates that the designation of "title" is omittable. The operation field 122 discloses operation contents corresponding to the object specifiers which can be implemented by the terminals, such as "watch" "record" or "listen to".

The control procedure field 123 discloses procedures needed to implement the user's request which is specified by the object specifier and the operation content. Such procedure is written in a certain language or is written according to a certain rule. Before explaining about each control procedure, some major terms used in the control procedure field 123 will be described hereunder.

whichHas:whichHas (type, name)

An inquiry to every terminal if it currently possesses a specified type or title of program (soft).

A return value is a structure comprising equipment, arg1, arg2 . . . , where the equipment represents the terminal apparatus possessing the specified program, and arg1, arg2 . . . constitute an argument list to be set to direct "show" to the terminal.

whichCan:whichCan (function)

Inquiry to every terminal if it possesses a certain function.

A return value is a structure comprising equipment, arg1, arg2..., where equipment is the terminal apparatus which has the designated function, and arg1, arg2... constitute an argument list to be set to implement the designated function.

whichIs:whichIs (status)

Inquiry to every terminal if it is in a certain status. A return value represents the corresponding terminal apparatus.

execute:execute (equipment, command, arg1, arg2...)

Direct equipment to execute command according to arg1, arg2...

connect:connect (equipment1, equipment2)

Connect an output of equipment 1 to the corresponding input of equipment 2.

where:

Execute according to the conditions which follow "where".

The control procedures in FIG. 4 will be described in order, starting with the first row. For a control procedure 123a at the first row, it is inquired if any of the terminal apparatuses possesses the movie identified by "title"; the terminal apparatus possessing the movie is regarded as a return value; and the terminal apparatus of the return value is requested to implement "show". However, if "title" is not included, it is inquired if any of terminal apparatuses possesses a movie, and the terminal apparatus responding to the inquiry in that it possesses a movie is regarded as a return value.

For a control procedure 123b at the second row, the terminal apparatus possessing the movie identified by [,title] is regarded as a return value 1 (retVal 1) and the terminal apparatus which has the function of "record Video" is regarded as a return value 2 (retVal 2); the output of the terminal apparatus of the return value 1 is connected to the input of the terminal apparatus of the return value 2; then the terminal apparatus of the return value 2 and the terminal apparatus of the return value 1 are requested to implement "record Video" and "show" respectively.

Control procedures 123c, 123d at the third and fourth rows are basically the same as the control procedures 123a, 123b at the first and second rows except that their object specifiers are "music" instead of "movie".

For a control procedure 123e at the fifth row, the terminal apparatus which is capable of showing the "weather forecast" program is regarded as a return value, and the terminal apparatus of the return value is requested to implement "show".

For control procedures 123f, 123g, the terminal apparatus which has been ON is regarded as running and the terminal apparatus possessing the function of "volume UP" and "volume DOWN" is regarded as a return value; the running terminal apparatus is compared to the terminal apparatus of the return value; and "volume UP" or "volume DOWN" is implemented on the running terminal apparatus.

Although in FIG. 4, only the above seven requests are described with their corresponding control procedures, the corresponding requests and control procedures will be added if other apparatuses, such as an air conditioner or an electric shutter are provided to terminals.

Figure 5:
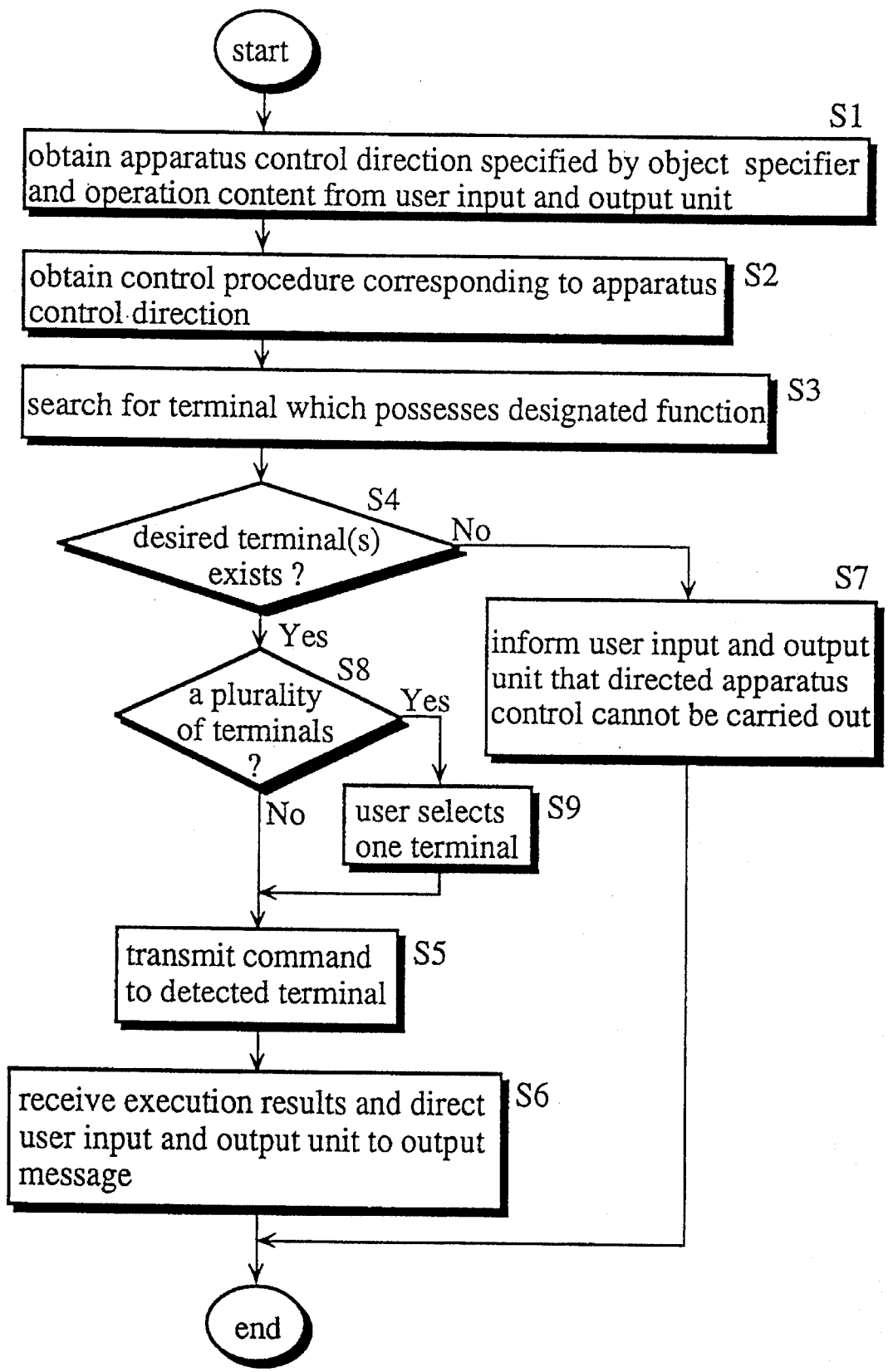
FIG. 5 shows a control by the apparatus control device.

When a request is inputted from the user input and output unit 110, the CPU 130 searches the storage 120 for the control procedure corresponding to the request, then analyzes and executes the control procedure. FIG. 5 shows that operation of the CPU 130.

The transmission and reception unit 140 transfers a transmission from the CPU 130 onto the bus 60, and receives a response to the transmission.

The terminal apparatuses 10 comprises a transmission and reception unit 11, a CPU 14, a clock 12, a storage 13, an apparatus input and output unit 15, an apparatus body 16, and a control information input unit 17. All the other terminal apparatuses 20, 30 have basically the same configuration as the terminal apparatus 10, so that the configuration is described only for the terminal apparatus 10 in FIG. 2.

The apparatus body 16 is a television, an audio tuner or the like to be controlled.

The transmission and reception unit 11 has the same configuration and operates the same as the transmission and reception unit 140 of the control device 100.

The clock 12 indicates present time, and notifies the CPU 14 of present time when requested.

The storage 13 stores a command table and a program information table as for each apparatus. For example, if a TV is prepared at terminal, the program information table of FIG. 6A includes a genre field 141 disclosing a genre, such as movie, music, sports, and a field 142 disclosing the air time, channel, and name of each program in the genre 141. The thus constructed program information table is stored in the storage 13 through the control information input unit 17.

The control information input unit 17 may be a character input means such as a keyboard. Or if a program information table is transmitted as text information by teletext, a means for receiving the text information and storing it into the storage is employed. Also, if a program information table is written in an IC card, a card reader is employed.

FIG. 6B shows the command table which is stored in the storage 13 as another information. This command table is designed for TV, and therein the commands sent from the control device 100 are corresponded to the information required to control the apparatus body 16 to satisfy the commands.

FIGS. 7A, 7B, 8A, and 8B are program information tables and command tables for audio tuner and VTR terminals.

Figure 9:
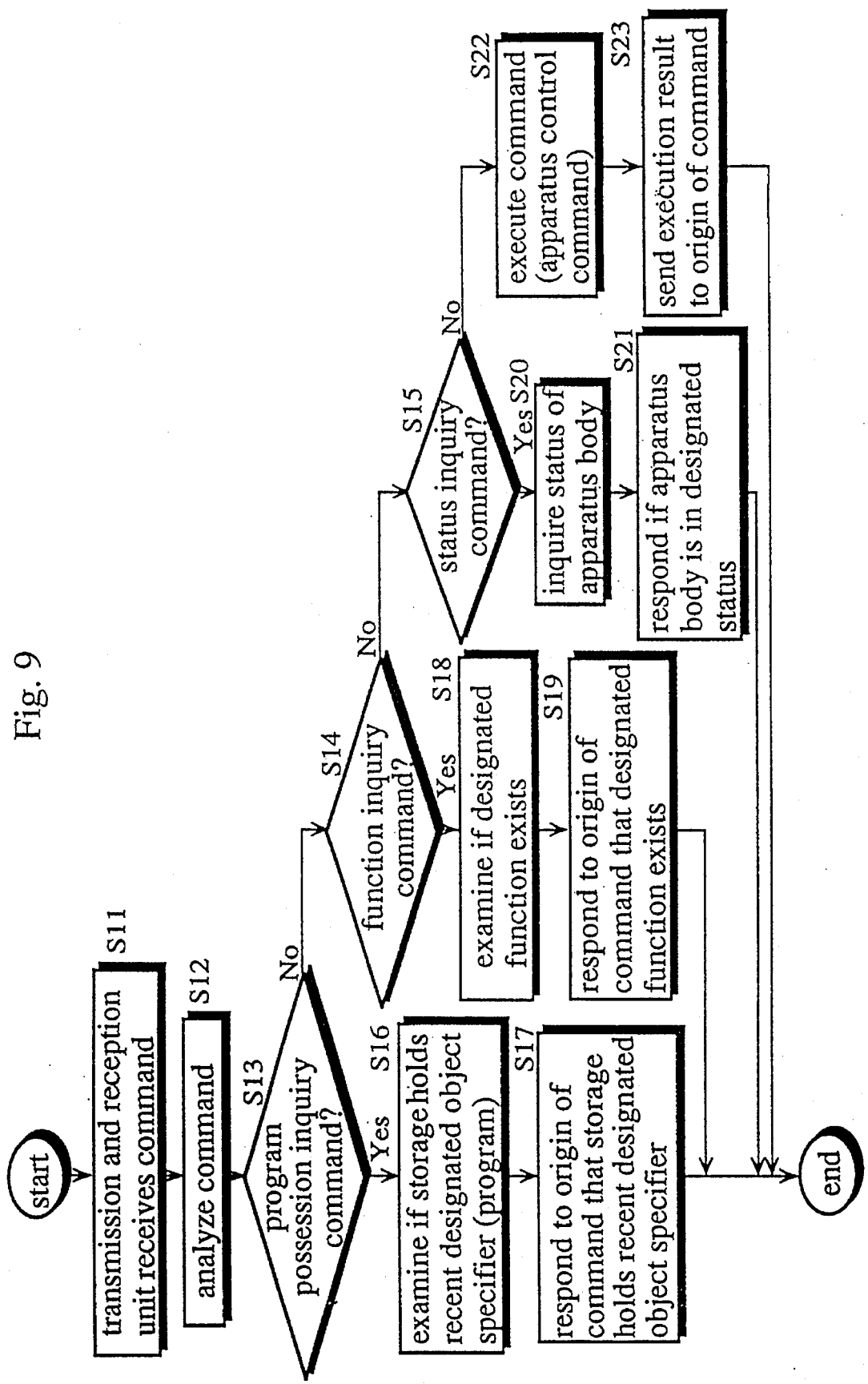
FIG. 9 is a flow chart describing a control operation over the terminal apparatuses.

The CPU 14 receives control information from the control device 100, and depending on the received control information the CPU 14 responds to the control device 100 as referring to the storage 13 and the clock 12, or controls the apparatus body 16 to implement the requested operation. FIG. 9 shows such control operation.

According to control information from the CPU 14, the apparatus input and output unit 15 turns on the apparatus body 16, dials the channel, or sets the apparatus into a record mode.

The operation of the thus constructed apparatus control system will be described as referring to FIGS. 6 and 9. If the user wants to watch the movie of "Gone with the Wind" and inputs that request through the user input and output unit 110 (S1), the CPU 130 of the control device 100 accesses the storage 120 to obtain the control procedure 123a in FIG. 4 (S2). Then, the CPU 130 interprets the control procedure, and inquires of every terminal apparatus if it has the movie of the above title (S3).

When receiving a command from the control device 100 (S11), each terminal apparatus interprets the command (S12). Since the command at this time is an inquiry asking if it possesses the specific program (S13), each terminal apparatus accesses the program information table in the storage 13 to decide if "Gone with the Wind" is present under the genre of movie (S16). Only the TV terminal has this program in this example, so that the other terminal apparatuses do not respond to the control device 100, but the TV terminal apparatus responds to the control device 100 by transmitting essential information to it, such as its identification (ID) number and the channel from which the movie will be aired (S17).

However, if the user requests to watch a movie, but does not include its title in the request, every terminal apparatus is asked if it has a movie at S1, S2, and S3. Then, the response from the terminal apparatus possessing a movie is awaited (S17).

When receiving the response, the control device 100 judges that the terminal apparatus possessing the requested program or any movie exists (S4), and transmits the command "show" integrated with the channel number n to that terminal apparatus (S5). When the response is received from a plurality of terminal apparatuses (S8), on the other hand, the user is informed of these terminal apparatuses on a monitor screen and is asked to select one of them (S9). Subsequently, the command is transmitted only to the selected terminal apparatus.

When receiving the command from the control device 100, the TV terminal analyzes the command, figures out that it is an execution command (S13, S14, S15), so that it executes the command (S22). To execute the command, the terminal recognizes that the "show n" command directs first turning on the TV and dialing the channel to n from the command table (FIG. 6B), then executing the command. The execution result is then sent to the control device 100 (S23). When receiving the execution result, the control device displays a message on the CRT screen, such as "21:00–23:21, your requested program will be aired on TV" (S6).

Figure 10:
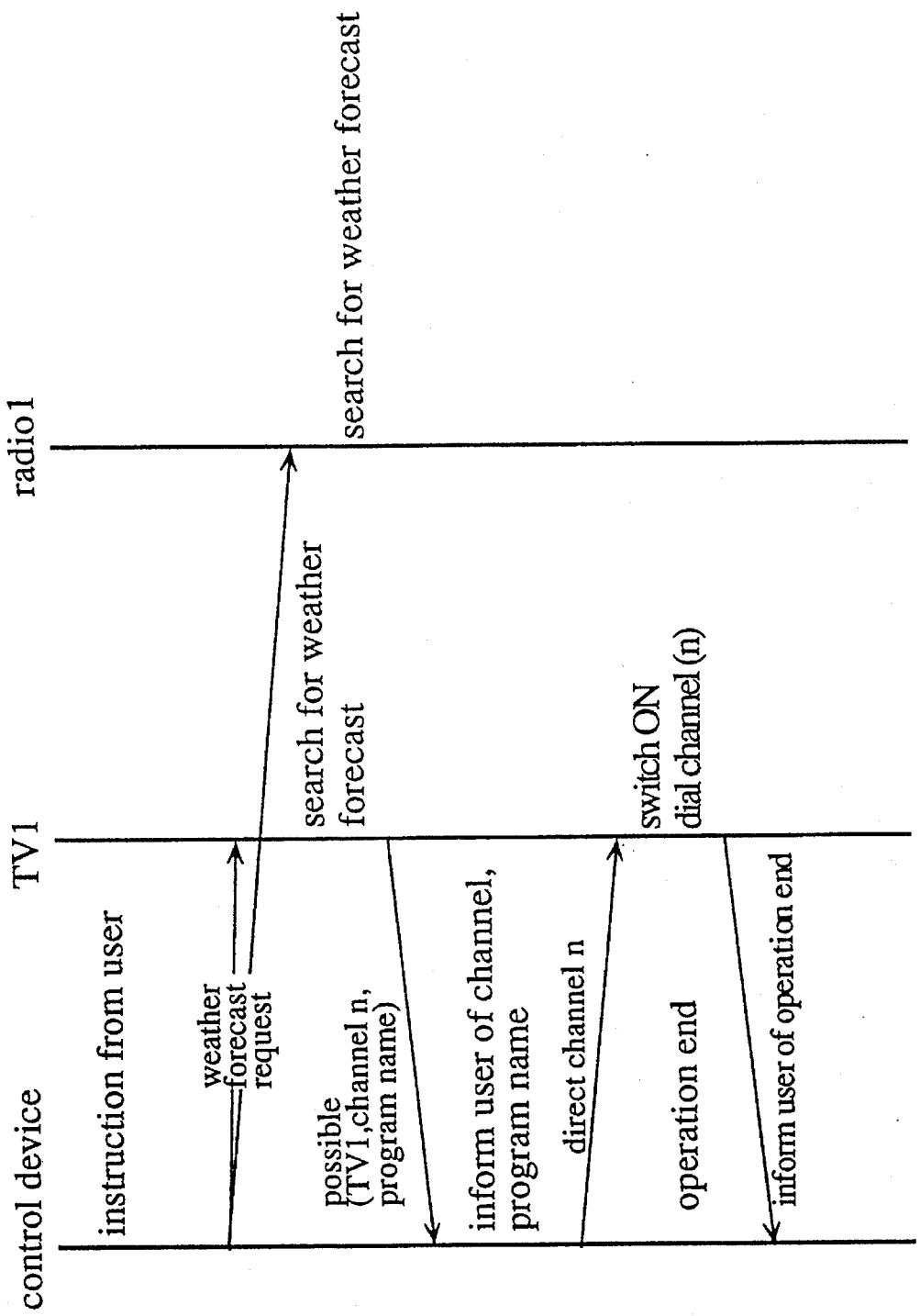
FIG. 10 shows a sequence example of an interaction between the apparatus control device and the terminal apparatuses.

Although the request for watching a certain program or the request for watching any movie is implemented in the above, any other requests can be implemented if the corresponding control procedure is prepared in FIG. 4. FIG. 10 illustrates the interaction sequence between the control device and the terminal apparatuses when the user inputs a request for obtaining a weather forecast. It is apparent from FIG. 10 that a TV 1 possessing a weather forecast program is controlled (turn ON, and dial channel) to provide the requested weather forecast program.

Figure 11:
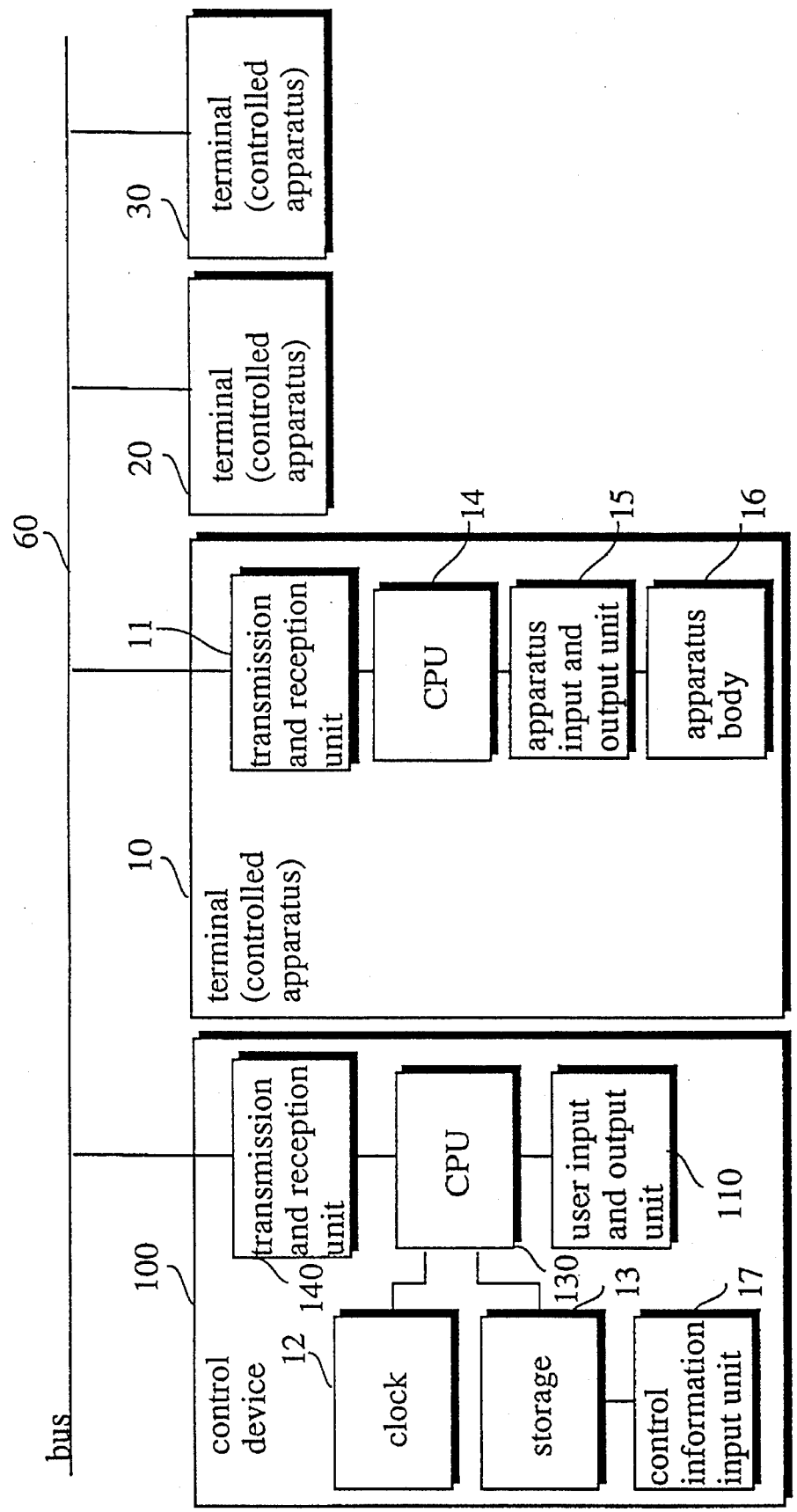
FIG. 11 is a block diagram showing another embodiment of the present invention.

Also, in the above, each terminal apparatus possesses the program information table of FIGS. 6A, 7A, or 8A, and the command table of FIGS. 6B, 7B, or 8B. Therefore, according to its own program information table, each terminal apparatus responds to an inquiry from the control device 100, and converts a command from the control device 100 into preset control information according to its own command table. However, the program information tables and the command tables can be possessed by the control device 100. In this case, the control device 100 does not necessarily inquire of the terminal apparatuses, and only control information, such as "turn ON" or "dial the channel to n" is transmitted from the control device 100 to the terminal apparatus. FIG. 11 is a block diagram showing the apparatus control system where the program information tables and the command tables are included in the control device 100.

[Embodiment 2]

A second embodiment of the present invention will be described. In the first embodiment, as shown in FIG. 4, the control procedure corresponding to each object specifier is stored in the control device; therefore, the corresponding control procedure is read according to each user's request, then it is examined and executed. In contrast, in the second embodiment, the control procedure in FIG. 4 is not prepared beforehand, but control procedure is generated dynamically according to each user's request. To achieve this, a storage 120 of a control device 100 includes the tables of FIGS. 12 and 13, and the CPU 130 operates according to the flow chart of FIG. 14. The table of FIG. 12 includes an object field 121, an operation field 122, and an output field 123. Basically the same as the object field and the operation field in FIG. 4, the user inputs an object specifier and the corresponding operation content to the object field 121 and the operation field 122 respectively. The output field 123 discloses a media type of output defined by each object specifier and operation content. For example, if the object specifier is "movie" and the operation content is "watch", the output media type will include both voice and image. If the object specifier is "movie" and the operation content is "record", the output media type will be voice and image recordable media such as a video tape, or a digital video disk. To be noted, the mark * in the output field indicates both the media types before and after the mark are needed; on the other hand, + in the output field indicates either of the media types before or after the mark is needed.

FIG. 13 is a table comprising an apparatus field 131, a command field 132, an input field 133, and an output field 134. All possible terminal apparatus are written in the apparatus field 131. Commands that can be directed to each terminal apparatus are written in the command field 132. An "n" in the command field represents a nth program or a nth channel. The media type needed to make an input to each apparatus is written in the input field 133, and the media type of an output from the terminal apparatus is written in the output field 134.

At a glance, the disclosure level in the output field 123 in FIG. 12 does not correspond to the disclosure level in the input field 133 and the output field 134 in FIG. 13. For example, "voice image recordable media" in the output field 123 in FIG. 12 represents a media which can be recorded voice or image, so "video tape" from the output field in FIG. 13 will fit in. As another example, "voice recordable media" is a media which can be recorded voice, so "audio tape" from the output field in FIG. 13 will fit in. Besides, "video tape" will fit in since it can record voice.

Therefore, in order to fill the disclosure gap, the storage of a control device stores the following hierarchy structure so as to judge if there exists an involution relationship between a value from the output field in FIG. 12 and values from the input field 133, the output field 134 in FIG. 13.

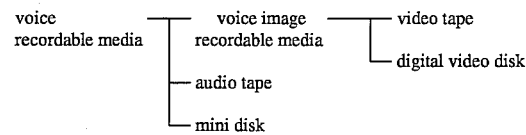

Figure 14A:
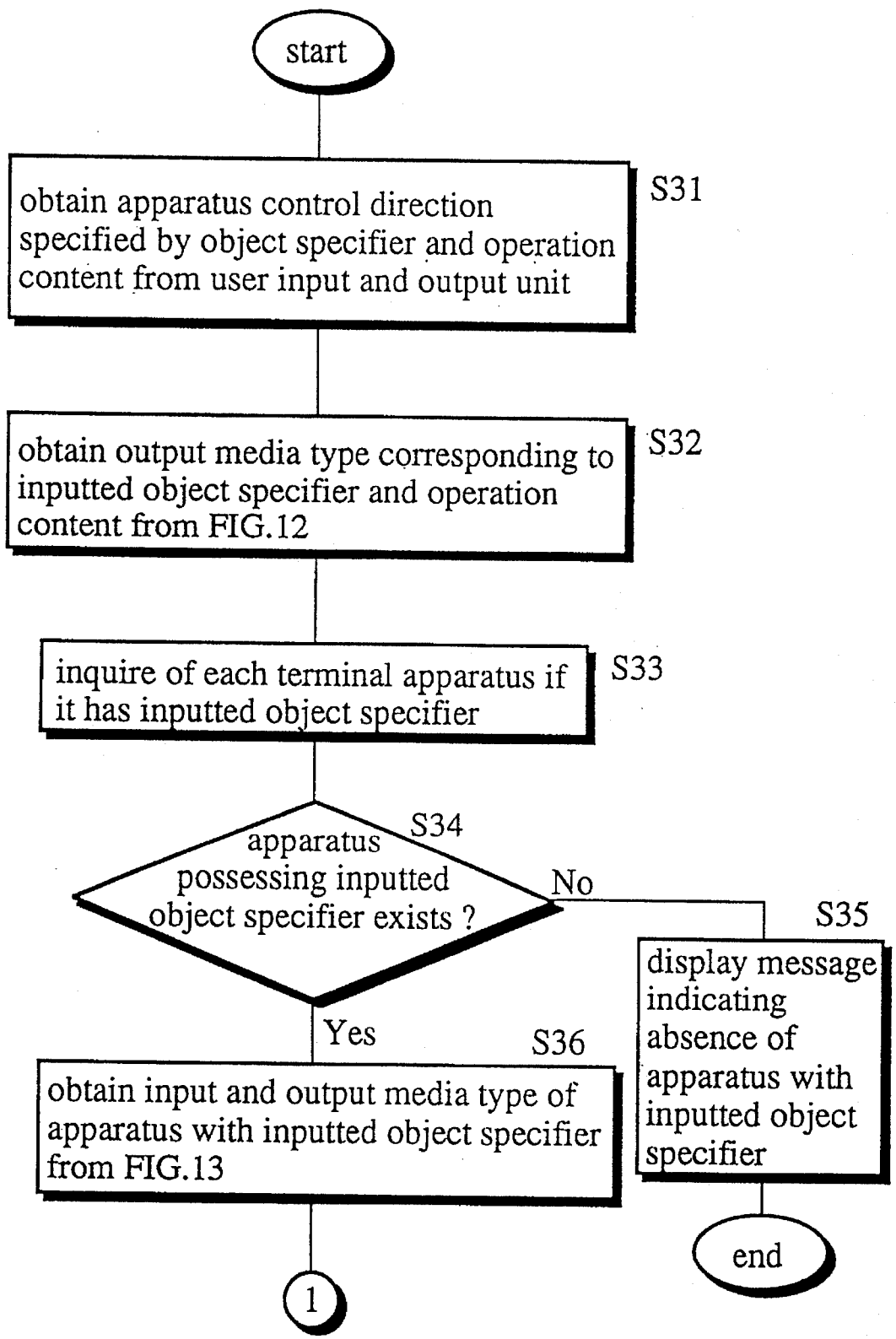
Figure 14B:
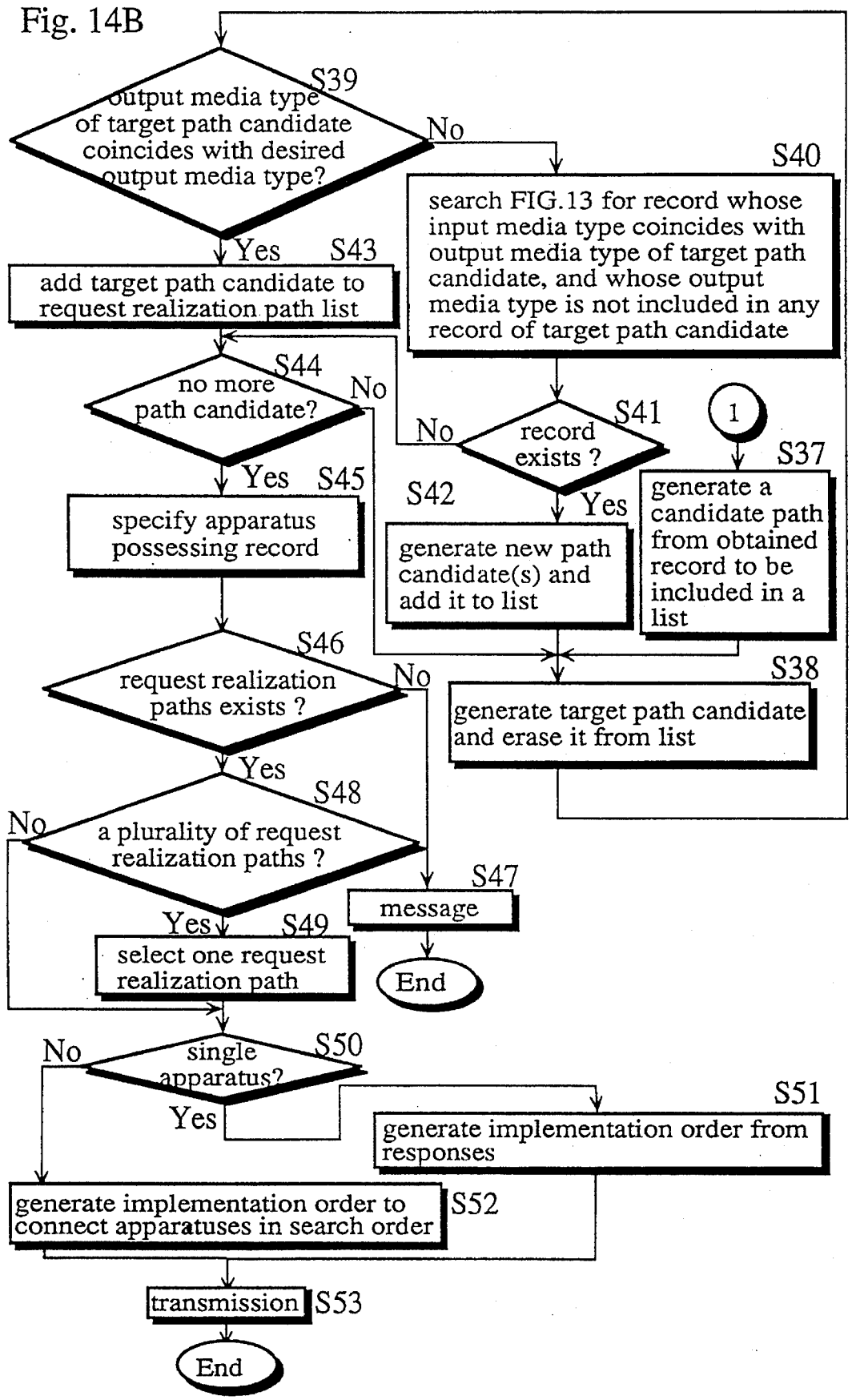

The method of generating control procedure dynamically from a request inputted by the user will be described as referring to FIG. 14. When the user inputs an object specifier and an operation content (S31), the output media type corresponding to the inputted object specifier and operation content is read from the output field 134 in FIG. 13 (S32). It is inquired to each terminal apparatus if it possesses the object specifier inputted by the user (S33). The response indicating the possession of the object is received, and a command to be transmitted to that terminal apparatus is received (S34). If no response is received from any apparatus, the message indicating that no apparatus possesses the object is displayed through the user input and output unit 110 (S35). When the response is received from an apparatus, on the other hand, the table of FIG. 13 is searched by the apparatus and the command, and the corresponding input and output media types are read from the input field 133 and the output field in FIG. 13 (S36). These input and output media types are regarded as one record, and the record is stored as a path candidate to be included in a path candidate list in the storage (S37).

Hereunder, the terms to be used after S37 will be explained. A "record" represents a pair of input media type and output media type from the input field 133 and the output field at the same row in FIG. 13, as well as it includes information showing on which row in FIG. 13 the pair is located. A "path candidate" alone does not satisfy a user's request, but can be a part. A "path candidate list" represents a list of path candidates to be processed, and a place for storing the path candidate list is constructed inside of the storage. A "target path candidate" represents the path candidate which is currently examined. A "request realization path" possesses all the records needed to realize a request. A "request realization list" is a list of request realization path (paths), and a place for storing this list is constructed inside of the storage.

When a path candidate list is generated at S37, the path candidate located at the top of this list is read as a target path candidate, at the same time the target path candidate is erased from the list (S38). It is examined if the output media type located at the end of the target path candidate coincides with the output media type read from the table of FIG. 12 (S39). If they do not coincide, the table of FIG. 13 is searched for the record(s) whose input media type coincides with the output media type located at the end of the target path candidate, also whose output media type is not included in any record for the target path candidate. Then, the searched record(s) is retrieved (S40). Subsequently, the retrieved record(s) is added to the end of the target path candidate so as to generate a new path candidate(s) (S42), and the newly generated path candidate(s) is added to the path candidate list.

The output media type read at S36 may not coincide with the output media type read at S39, particularly when the user requests to record a movie or music. That is, when the user requests to record a movie of a certain title, every terminal apparatus is inquired if it has the object specifier of this movie. As a result of the inquiry, it is found that both TV and video tuner terminal apparatuses possess the movie. According to the response from these terminal apparatuses, the record of "radio wave" and "image signal, voice signal" or the record of "radio wave" and "image, voice" will be read from the input field 133 and the output field 134 in FIG. 13. On the other hand, the output media type read from FIG. 12 according to the user's request is "voice image recordable media", and this does not coincide with either of the output media types included in the records read from FIG. 13. In this case, the operation is forwarded to S40 to search for the terminal apparatus which possesses the input media type which is the same as the output media type included in the record read from FIG. 13. Take for instance of the above example, as for the TV terminal, the output media type is "image, voice"; however, no terminal apparatus in FIG. 13 possesses the input media type of "image, voice." As for the video tuner terminal, on the other hand, the output media type is "image signal, voice signal", and two terminal apparatuses, TV and VTR apparatuses, possess the input media type of "image signal, voice signal". Therefore, at S42 these two terminal apparatuses are stored, and the records corresponding to these two apparatuses are added to generate a new path candidate(s). The newly generated path candidate(s) is stored in the path candidate list.

The output media type of the VTR which possesses the input media type of "image signal, voice signal" is "video tape". The output media type of the TV terminal which possesses the input media type of "image signal, voice signal" is "image, voice", These output media types are compared with the output media type read from FIG. 12, and it is found that the output media type of the VTR terminal coincides with the output media type read from FIG. 12. Consequently, the operation is forwarded to S43.

Thus, when the output media type located at the end of the target path candidate does not coincide with the output media type read from FIG. 12 (S39), the operations of S40, S42, S38 are repeated to generate new path candidates. On the other hand, if they coincide at S39, the current target path candidate is stored in the request realization path list (S43); the path candidate at the top of the path candidate list is read; and the operations of S38–S44 are repeated. Then, when no path candidate exists in the path candidate list any longer (S44), the operation is forwarded to S45. For each request realization path from the request realization path list, it is examined if the apparatus possessing the record exists on the bus (S45). If the corresponding apparatus does not exist, an error message will be displayed (S47). When only one request realization path which satisfies this condition exists, this path is retrieved. However, if a plurality of request realization paths exist (S46), one of these request realization paths is selected by the user (S49), and it is judged; according to FIG. 13, if a plurality of apparatuses have to be combined to implement the request, or one apparatus is enough (S50). In the above example, the request for recording a certain movie is implemented by a combination of video tuner and VTR terminals, so that the operation is forwarded to S52, and a control procedure is generated to connect these two apparatuses in their search order. According to the generated control procedure, the output of the video tuner terminal is connected to the input of the VTR terminal, and commands are transmitted to these apparatuses. Consequently, the user's request is carried.

When a request is implemented by a single apparatus, a predetermined implementation order is generated at S51, and is transmitted to the apparatus (S53).

Additionally, the table of FIG. 13 is generated and stored beforehand in the above, it can be generated afterward by making an inquiry to each terminal apparatus upon each needs.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus control system where a major terminal for inputting a user's request is connected via a communication path to an apparatus terminal which has an apparatus for implementing the user's request, the apparatus control system comprising:

a request accepting means for accepting the user's request written in accordance with a certain form;

a storing means for storing a correspondence table where each request is corresponded to a control procedure written in accordance with a certain rule;

a retrieving means for retrieving the control procedure which corresponds to each user's request;

a command dividing means for interpreting a control procedure and dividing the control procedure into a first command for obtaining an apparatus name and a second command for obtaining an operation content;

a corresponding apparatus identifying means using the first command to identify the apparatus which implements the user's request;

an implementation directing means for using the second command to generate an indication for the apparatus identified by the corresponding apparatus identifying means and for transmitting the generated indication to the apparatus; and an implementation controller for receiving the indication and controlling an operation of the apparatus according to the received indication.

2. The apparatus control system of claim 1, wherein the request accepting means comprises a receiving means for receiving an object specifier included in each user's request, and another receiving means for receiving an operation content included in the user's request.

3. The apparatus control system of claim 2, wherein the storing means corresponds the control procedure to a pair of the object specifier and the operation content.

4. The apparatus control system of claim 3, wherein the control procedure comprises an inquiry which asks if there exists any apparatus which possesses the object specifier and the operation content included in the user's request and if such apparatus has been turned on, and an implementation statement which specifies the apparatus basing upon a response to the inquiry and directs the specified apparatus to implement the user's request;

the corresponding apparatus identifying means comprises a unit for interpreting and executing the inquiry; and the implementation directing means comprises a unit for interpreting and executing the implementation statement.

5. The apparatus control system of claim 4, wherein the apparatus terminal further comprises a responding means for accepting the inquiry from the major terminal, and transmitting a response if its own apparatus possesses information relating to the accepted inquiry.

6. The apparatus control system of claim 5, wherein the apparatus at the apparatus terminal is a visual and audio apparatus selected from one of a TV, a VTR, and a CD player;

each apparatus terminal has a program information table where programs possessed by its apparatus are classified by genre; and the responding means at each apparatus terminal searches the genre which includes a certain program when the inquiry from the major terminal asks if the apparatus terminal possesses the certain program.

7. The apparatus control system of claim 4, wherein the apparatus at the apparatus terminal is a visual and audio apparatus, and the major terminal further comprises;

a program information table where programs possessed by the apparatus at each apparatus terminal are classified by genre; and a responding means for searching the genre including a certain program when the inquiry from the corresponding apparatus identifying means asks if the major terminal possesses the certain program, and making a response to the inquiry if the major terminal possesses it.

8. An apparatus control system where a major terminal for inputting a user's request is connected via a communication path to an apparatus terminal which has an apparatus for implementing the user's request, the apparatus control system comprising:

a request accepting means for dividing each user's request into an object specifier which does not include information which directly specifies an apparatus and an operation content indicating what to be done with an object of the object specifier, and accepting the object specifier and the operation content separately;

a corresponding apparatus identifying means for interpreting the object specifier and the operation content so as to identify an apparatus which can execute a specified operation and detecting an operation of the identified apparatus which is required to implement the user's request;

a control procedure generating means for generating a control procedure in accordance with a certain rule from the identified apparatus and the detected operation;

an implementation directing means for interpreting the generated control procedure and transmitting a command to the identified apparatus to implement the user's request; and an implementation controller for receiving the command, and controlling the apparatus according to the command.

9. The apparatus control system of claim 8, wherein the apparatus identifying means comprises:

a first table for storing a correspondence between an output form and a pair of the object specifier and the operation content included in the user's request, the output form being a media which will be received by the user when his/her request is implemented;

a second table for storing an input form and an output form according to each operation of each apparatus;

an output form detecting unit for searching the first table by the user's request to detect the output form which will be employed to implement the user's request;

a judging unit for searching the second table by the apparatus possessing the object, detecting the output form of the apparatus, and judging if the detected output form coincides with the output form detected from the first table;

a subordinate apparatus detecting unit for, when the judging unit judges that the output form from the second table does not coincide with the output form from the first table, detecting the apparatus which possesses the output form from the second table as its input form, sending the output form of the detected apparatus to the judging unit so that the output form is compared with the output form from the first table, and repeating its operations until the judging unit finds the coincidence between the output form from the first table and the output form from the second table, in which when the judging unit finds the coincidence, the control procedure generating means generates a control procedure by which the detected apparatus implements the operation included in the user's request if only one apparatus is detected, while if a plurality of apparatuses are detected, the control procedure generating means generates a control procedure by which the detected apparatuses are connected in order of the detection.

10. The apparatus control system of claim 9, wherein the corresponding apparatus identifying means further comprises:

an inquiry means for inquiring of each apparatus terminal if it possesses the object specifier included in the user's request before the judging unit starts its operation; and a response receiving means for receiving a response from the apparatus which was found to possess the object by the inquiry.

11. The apparatus control system of claim 10, wherein the apparatus terminal further comprises a responding means for accepting the inquiry from the major terminal, and transmitting a response if its own apparatus possesses information relating to the accepted inquiry.

12. The apparatus control system of claim 11, wherein the apparatus at the apparatus terminal is a visual and audio apparatus;

each apparatus terminal has a program information table where programs possessed by its apparatus are classified by genre; and the responding means at each apparatus terminal searches the genre which includes a certain program when the inquiry from the major terminal asks if the apparatus terminal possesses the certain program.

13. An apparatus control system where a major terminal for inputting a user's request is connected via a communication path to an apparatus terminal which has an apparatus for implementing the user's request, the apparatus control system comprising:

a request accepting means for accepting the user's request written in accordance with a certain form, including a first receiving means for receiving an object specifier included in each user's request, and a second receiving means for receiving an operation content included in the user's request;

a storing means for storing a correspondence table where each request is corresponded to a control procedure written in accordance with a certain rule which corresponds the control procedure to an object specifier and an operation content;

a retrieving means for retrieving the control procedure which corresponds to each user's request wherein the control procedure comprises an inquiry which asks if there exists any apparatus which possesses the object specifier and the operation content included in the user's request and if such apparatus has been turned on, and an implementation statement which specifies the apparatus based upon a response to the inquiry and directs the specified apparatus to implement the user's request;

a corresponding apparatus identifying means for interpreting the retrieved control procedure to identify the apparatus which implements the user's request including a unit for interpreting and executing the inquiry;

an implementation directing means for transmitting to the identified apparatus a command which directs an implementation of the user's request including a unit for interpreting and executing the implementation statement; and an implementation controller for receiving the command and controlling an operation of the apparatus according to the received command.

14. The apparatus control system of claim 13, wherein the apparatus terminal further comprises a responding means for accepting the inquiry from the major terminal, and transmitting a response if its own apparatus possesses information relating to the accepted inquiry.

15. The apparatus control system of claim 14, wherein the apparatus at the apparatus terminal is a visual and audio apparatus;

each apparatus terminal has a program information table where programs possessed by its apparatus are classified by genre; and the responding means at each apparatus terminal searches the genre which includes a certain program when the inquiry from the major terminal asks if the apparatus terminal possesses the certain program.

16. The apparatus control system of claim 13, wherein the apparatus at the apparatus terminal is a visual and audio apparatus, and the major terminal further comprises:

a program information table where programs possessed by the apparatus at each apparatus terminal are classified by genre; and a responding means for searching the genre including a certain program when the inquiry from the corresponding apparatus identifying means asks if the major terminal possesses the certain program, and making a response to the inquiry if the major terminal possesses it.

17. An apparatus control system where a major terminal for inputting a user's request is connected via a communication path to a visual and audio apparatus terminal which has an apparatus for implementing the user's request, the apparatus control system comprising:

a request accepting means for dividing each user's request into an object specifier and an operation content indicating what to be done with the object of the object name, and accepting the object specifier and the operation content separately;

a corresponding apparatus identifying means for identifying the apparatus which is specified exclusively by the object specifier and the operation content, and detecting an operation of the identified apparatus which is required to implement the user's request including a first table for storing a correspondence between an output form and a pair of the object specifier and the operation content included in the user's request, the output form being media which will be received by the user when his/her request is implemented;

a second table for storing an input form and an output form according to each operation of each apparatus;

an output form detecting unit for searching the first table by the user's request to detect the output form which will be employed to implement the user's request;

a judging unit for searching the second table by the apparatus possessing the object, detecting the output form of the apparatus, and judging if the detected output form coincides with the output form detected from the first table;

a subordinate apparatus detecting unit for, when the judging unit judges that the output form from the second table does not coincide with the output form from the first table, detecting the apparatus which possesses the output form from the second table as its input form, sending the output form of the detected apparatus to the judging unit so that the output form is compared with the output form from the first table, and repeating its operations until the judging unit finds the coincidence between the output form from the first table and the output form from the second table, in which when the judging unit finds the coincidence, the control procedure generating means generates a control procedure by which the detected apparatus implements the operation included in the user's request if only one apparatus is detected, while if a plurality of apparatuses are detected, the control procedure generating means generates a control procedure by which the detected apparatuses are connected in order of the detection;

an inquiry means for inquiring of each apparatus terminal if it possesses the object specifier included in the user's request before the judging unit starts its operation;

a response receiving means for receiving a response from the apparatus which was found to possess the object by the inquiry;

a control procedure generating means for generating a control procedure in accordance with a certain role from the identified apparatus and the detected operation;

an implementation directing means for interpreting the generated control procedure and transmitting a command to the identified apparatus to implement the user's request; and an implementation controller for receiving the command, and controlling the apparatus according to the command, wherein the apparatus terminal further comprises a responding means for accepting the inquiry from the major terminal, and transmitting a response if its own apparatus possesses information relating to the accepted inquiry, each apparatus terminal has a program information table where programs possessed by its apparatus are classified by genre, and the responding means at each apparatus terminal searches the genre which includes a certain program when the inquiry from the major terminal asks if the apparatus terminal possesses the certain program.

* * * * *